United States Patent
Hans et al.

(10) Patent No.: US 8,607,050 B2
(45) Date of Patent: Dec. 10, 2013

(54) METHOD AND SYSTEM FOR ACTIVATION

(75) Inventors: Sebastian Hans, Berlin (DE); Alexander Glasman, St. Petersburg (RU); Natalia Ivanova, St. Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 13/459,331

(22) Filed: Apr. 30, 2012

(65) Prior Publication Data

US 2013/0290714 A1  Oct. 31, 2013

(51) Int. Cl.
    H04L 9/32    (2006.01)
(52) U.S. Cl.
    USPC .......................................................... 713/168
(58) Field of Classification Search
    USPC .......................................................... 713/168
    See application file for complete search history.

(56) References Cited

U.S. PATENT DOCUMENTS

| | | | |
|---|---|---|---|
| 6,836,670 B2 * | 12/2004 | Castrogiovanni et al. | 455/558 |
| 7,620,186 B2 * | 11/2009 | Sozzani et al. | 380/277 |
| 7,690,027 B2 | 3/2010 | Sandberg | |
| 7,715,822 B2 * | 5/2010 | Semple et al. | 455/411 |
| 7,929,959 B2 * | 4/2011 | De Atley et al. | 455/418 |
| 8,046,581 B2 * | 10/2011 | Netanel | 713/168 |
| 8,141,137 B2 * | 3/2012 | Ishikawa | 726/6 |
| 8,428,570 B2 * | 4/2013 | De Atley et al. | 455/418 |
| 2003/0236983 A1 * | 12/2003 | Mihm, Jr. | 713/172 |
| 2005/0149740 A1 * | 7/2005 | Kotzin et al. | 713/185 |
| 2006/0075259 A1 * | 4/2006 | Bajikar et al. | 713/189 |
| 2008/0051062 A1 | 2/2008 | Lee | |
| 2009/0172397 A1 | 7/2009 | Kim | |
| 2010/0025480 A1 * | 2/2010 | Nishizawa et al. | 235/492 |
| 2010/0099380 A1 | 4/2010 | Chen | |

FOREIGN PATENT DOCUMENTS

| | | |
|---|---|---|
| GB | 2406925 A | 4/2005 |
| WO | 02082387 A1 | 10/2002 |
| WO | WO 2009029155 A1 * | 3/2009 |

OTHER PUBLICATIONS

Extensible Authentication Protocol Method for Global System for Mobile Communications (GSM) Subscriber Identity Modules (EAP-SIM); H. Haverinen, J. Salowey; Jan. 2006; RFC 4186.*

Register via Internet on your mobile device. Retrieved from the Internet <http://www.mobem.com/register/cestar28r3/reg_net.php>, 2011 (5 pages).

(Continued)

Primary Examiner — Edan Orgad
Assistant Examiner — James Turchen
(74) Attorney, Agent, or Firm — Osha Liang LLP (57) ABSTRACT

An activation method includes a security module card verifying an activation server using a shared secret key and a first challenge, mediating a verification of the activation server by a mobile device, and encrypting the second challenge using a generated key to obtain an encrypted second challenge. The security module card further transmits the encrypted second challenge and a third challenge to the mobile device. The method further includes receiving an encrypted third challenge from the mobile device, decrypting the encrypted third challenge to obtain a received third challenge, verifying the mobile device based on the received third challenge being equal to the third challenge sent to the mobile device, and sending a validation of mutual trust between the security module card and the mobile device to the activation server.

20 Claims, 7 Drawing Sheets (56) References Cited

OTHER PUBLICATIONS

How to register your mobile phone on Immobilise. Retrieved from the Internet <http://www.immobilise.com/how-to-register-your-mobile-phone.html>, 2011 (3 pages).

How to Setup your New Google Android Phone. Retrieved from the Internet <http://androidadvices.com/setup-google-android-phone/>, 2011 (11 pages).

Register your mobile phone—Google Calendar Help. Retrieved from the Internet <http://support.google.com/calendar/bin/answer.py?hl=en&answer=45351>, 2011 (1page).

Medvedenko, N., Motwani, R. "OJWC, a Superior Java ME Application Environment", Oracle JAVA wireless client, 2011 (38 pages).

Peng, Z., Yuhui, X., Zishan, M., Junwei, Z. "The Research of Event-Triggered Application in Proactive SIM Card" Wireless Communications, Networking and Mobile Computing, 2009 (1 page).

International Search Report issued in PCT/US2013/035578 dated Jun. 26, 2013 (4 pages).

Menezes, Vanstone, Oorschot, "Handbook of Applied Cryptography", XP-002698907, CRC Press LLC, USA, 1997 (12 pages).

Written Opinion from PCT/US2013/035578 dated Jun. 26,2013 (4 pages).

\* cited by examiner

METHOD AND SYSTEM FOR ACTIVATION

BACKGROUND

Mobile devices are pervasive. To use a mobile device, a subscriber identity module card in the mobile device is typically authenticated. Based on the authentication, the device can access services on a network.

SUMMARY

In general, in one aspect, the invention relates to a method for activation. The method includes a security module card verifying an activation server using a shared secret key and a first challenge, mediating, in response to verifying the activation server, a verification of the activation server by a mobile device, the verification uses a second challenge and a key pair, and encrypting the second challenge using a generated key to obtain an encrypted second challenge. The verification uses a second challenge and a key pair, and the generated key is generated by the activation server. The security module card further transmits the encrypted second challenge and a third challenge to the mobile device. The mobile device verifies the security module card using the encrypted second challenge. The security module card further receives an encrypted third challenge from the mobile device and decrypts the encrypted third challenge to obtain a received third challenge. The security module card verifies the mobile device based on the received third challenge being equal to the third challenge sent to the mobile device and sends a validation of mutual trust between the security module card and the mobile device to the activation server.

In general in one aspect, the invention relates to a security module card for activation. The security module card includes secured memory that includes a shared secret key and a card activation module. The card activation module is configured to verify an activation server using a shared secret key and a first challenge, mediate, in response to verifying the activation server, a verification of the activation server by a mobile device, the verification uses a second challenge and a key pair, and encrypt the second challenge using a generated key to obtain an encrypted second challenge. The verification uses a second challenge and a key pair, and the generated key is generated by the activation server. The card activation module is further configured to transmit the encrypted second challenge and a third challenge to the mobile device. The mobile device verifies the security module card using the encrypted second challenge. The card activation module is further configured to receive an encrypted third challenge from the mobile device, decrypt the encrypted third challenge to obtain a received third challenge, verify the mobile device based on the received third challenge being equal to the third challenge sent to the mobile device, and send a validation of mutual trust between the security module card and the mobile device to the activation server.

In general, in one aspect, the invention relates to a system. The system includes a security module card and a mobile device. The security module card includes secured memory that includes a shared secret key and a card activation module. The card activation module is configured to verify an activation server using a shared secret key and a first challenge, mediate, in response to verifying the activation server, a verification of the activation server by a mobile device, the verification uses a second challenge and a key pair, and encrypt the second challenge using a generated key to obtain an encrypted second challenge. The verification uses a second challenge and a key pair, and the generated key is generated by the activation server. The card activation module is further configured to transmit the encrypted second challenge and a third challenge to the mobile device. The mobile device verifies the security module card using the encrypted second challenge. The card activation module is further configured to receive an encrypted third challenge from the mobile device, decrypt the encrypted third challenge to obtain a received third challenge, verify the mobile device based on the received third challenge being equal to the third challenge sent to the mobile device, and send a validation of mutual trust between the security module card and the mobile device to the activation server. The mobile device is operatively connected to the security module card. The mobile device includes mobile device memory that includes a public key in the key pair, and a mobile device activation module. The mobile device activation module is configured to send the second challenge to the activation server via the security module card, receive from the activation server an encrypted value via the security module card, decrypt the encrypted value using the public key of the activation server to obtain a value, and verify the second challenge sent by the mobile device is equal to the second challenge in the value to verify the activation server.

Other aspects of the invention will be apparent from the following description and the appended claims.

DETAILED DESCRIPTION

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for activating a mobile device and a security module card with an activation server. Specifically, embodiments provide a method for establishing three-way mutual trust between the mobile device, the security module card, and the activation server. In the three way mutual trust, the activation server validates the security module card and the security module card validates the application server so that both components confirm that neither the activation server nor the security module card is nefarious. Similarly, the security module card validates the mobile device and the mobile device validates the security module card so that both components confirm that neither the mobile device nor the security module card is nefarious. Finally, the activation server validates the mobile device and the mobile device validates the application server so that both components confirm that neither the activation server nor the mobile device is nefarious. Based on the successful completion of the three way activation, the activation server stores the identification of the security module card and the mobile device pair to activate both devices. In other words, the security module card and the mobile device are stored as a pair so that if either or both the security module card and the mobile device are replaced with a different security module card or mobile device, a new three way activation is performed in one or more embodiments of the invention. In one or more embodiments of the invention, a new three way activation may additionally or alternatively be performed when the activation server triggers a new three way activation by sending a request to the security module card.

In various figures, the specification, and the claims, communications between the mobile device and the activation server are described as being performed through the security module card. In other words, the security module card is described as receiving communications from the activation server or the mobile device and forwarding the communications to the mobile device or activation server. In one or more embodiments of the invention, the security module card may be directly connected to the network and act as an intermediary between the mobile device and the activation server for at least a portion of the communications. In alternative embodiments of the invention, communications are deemed to be performed through the security module card when the mobile device receives a communication from the activation server, transmits the communication to the security module card for preprocessing, and then receives the preprocessed communication from the security module card. Likewise, communications are deemed to be performed through the security module card when the mobile device transmits a communication to the security module card for preprocessing, receives the preprocessed communication from the security module card, and transmits the preprocessed communication to the activation server. Such preprocessing may include, for example, encrypting all or part of the communication or message (e.g., encrypt the entire body of a message), performing identity management, adding identifiers, generating encryption keys for a communication session, and performing other such acts.

Figure 1:
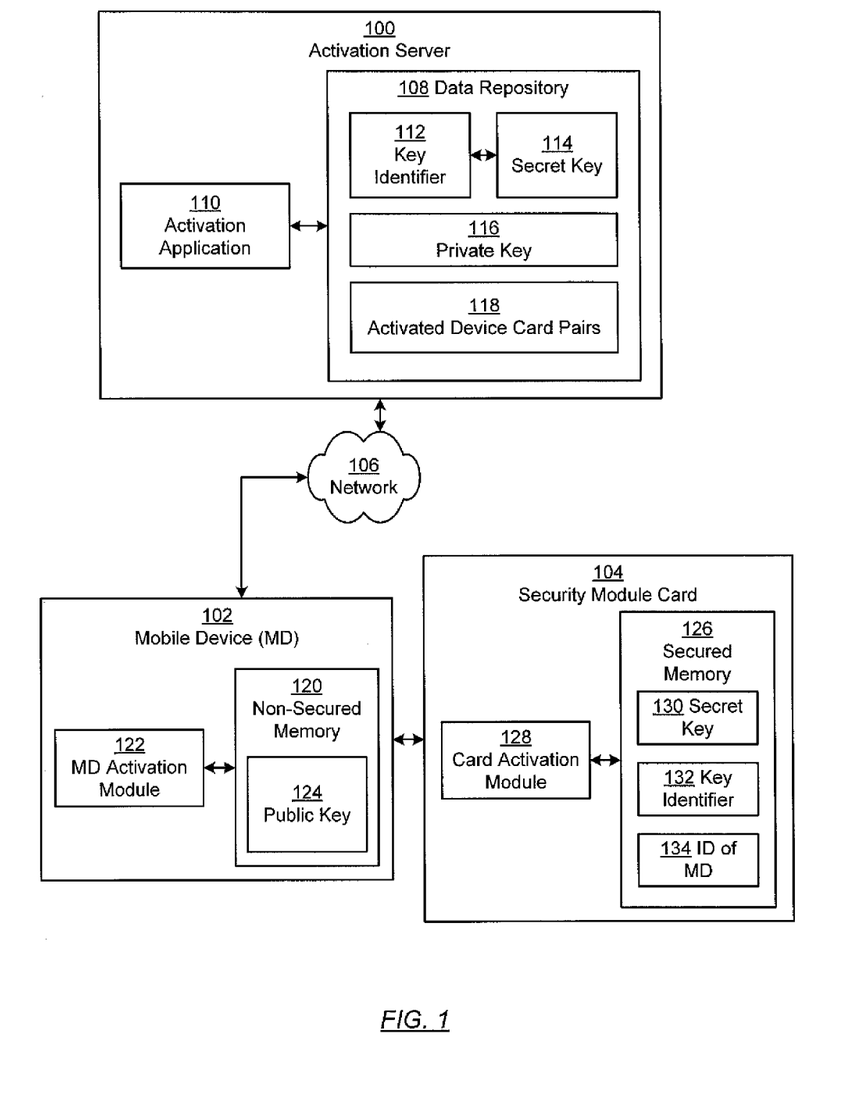
FIG. 1 shows a schematic diagram of a system in accordance with one or more embodiments of the invention.

FIG. 1 shows a schematic diagram of a system in accordance with one or more embodiments of the invention. As shown in FIG. 1, the system includes an activation server (100), a mobile device (102), a security module card (104), and a network (106). Each of these components is discussed below.

In one or more embodiments of the invention, the activation server (100) is one or more computing devices that include functionality to activate mobile device and security module card pairs. The activation server may include additional functionality that is related or not related to activation without departing from the scope of the claims. In one or more embodiments of the invention, the activation server (100) is managed by service provider (not shown). Specifically, the activation server (100) is configured to activate the mobile device and security module pairs on behalf of the service provider. In one or more embodiments of the invention, the service provider may be a carrier providing mobile network services to the activation server based on the activation. In alternative or additional embodiments, the activation server (100) may be independent of the carrier. For example, the service provider may provide applications and/or services to the mobile device (102) (discussed below) and/or the security module card (104) (discussed below).

In one or more embodiments of the invention, the activation server (100) includes a data repository (108) and an activation application (110). In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. In one or more embodiments of the invention, the data repository (108), or a portion thereof, is secure.

In one or more embodiments of the invention, the data repository (108) includes functionality to store a secret key (114) and a key identifier (112), a private key (116), and activated device card pairs (118). A secret key (114), also referred to herein as a shared secret key, is a cryptographic key that is known to all parties authorized to view a private communication. In one or more embodiments of the invention, a copy of the secret key (114) is stored by both the data repository (108) and the security module card (104) (discussed below). Specifically, the data repository (108) stores a first copy of the secret key while the security module card (104) stores a second copy of the secret key. In one or more embodiments of the invention, the secret key (114) is a random or pseudorandom string of alphanumeric characters or bits that is used to encrypt and decrypt one or more communications.

In one or more embodiments of the invention, although not shown in FIG. 1, the data repository stores multiple secret keys. Each secret key (114) is associated with a key identifier (112) in one or more embodiments of the invention. The key identifier (112) uniquely identifies the corresponding secret key (114) amongst other keys in the data repository (108). In other words, the key identifier (112) is a unique identifier for the corresponding secret key (114).

In one or more embodiments of the invention, a separate secret key exists for each security module card (104) (discussed below). Specifically, the secret key for a particular security module card (104) is distinct from the secret key for any other security module card (not shown). In one or more embodiments of the invention, each secret key is unique from other secret keys stored in the data repository (108). In alternative or additional embodiments of the invention, some secret keys may be unintentionally the same based on the particular technique used to generate the secret keys. In alternative or additional embodiments of the invention, a separate secret key and key identifier pair may exist for an entire batch of security module cards. In other words, while different batches of security module cards each have a unique secret key and key identifier from other batches of security module cards, security module cards in the same batch may share a secret key and key identifier. In such a scenario, the data repository may store only a single secret key and key identifier for each batch.

In one or more embodiments of the invention, a private key (116) is a cryptographic key that is known only by a sender of a communication. Specifically, a private key (116) is used in asymmetric key encryption. In other words, the private key (116) is used to encrypt a corresponding communication. The private key (116) has a corresponding public key (e.g., public key (124) (discussed below)) that may be used to by a cryptographic algorithm to decrypt a communication encrypted using the private key.

In one or more embodiments of the invention, although not shown in FIG. 1, the private key and public key may have a corresponding key pair identifier. The key pair identifier may be used to uniquely identify the key pair. For example, in one or more embodiments of the invention, the private key may be associated with the mobile device. Each authentication server that authenticates the mobile device may have a copy of the private key for the mobile device. In such a scenario, the authentication server and mobile device may use a key pair identifier to uniquely identify both the public and the private keys in the key pair.

Continuing with the data repository (108), the activated device card pairs (118) corresponds to identifiers of mobile device and security module card pairs that are activated in one or more embodiments of the invention. Each pair includes an identifier of a mobile device and an identifier of a security module card in one or more embodiments of the invention. The storage of the identifier of a mobile device and the identifier of a security module card as a pair indicates the relationship between the mobile device and the security module card. Thus, for example, if the particular security module card, which was previously activated with the particular mobile device, is added to a different mobile device, then the particular security module card and the different mobile device is not in the activated device card pairs in one or more embodiments of the invention. Specifically, in one or more embodiments of the invention, the particular security module card and the different mobile device are not considered an activated unit until three way mutual trust is established.

In one or more embodiments of the invention, the data repository (108) is operatively connected to an activation application (110). The activation application (110) includes functionality to perform activation with the mobile device and the security module card for the activation server (100). The activation application (110) may be software, hardware, or a combination thereof.

In one or more embodiments of the invention, the activation application may be implemented as part of a management server (not shown) for managing mobile devices and security module cards. Specifically, the management server may be configured to manage applications and firmware on mobile devices and security module cards. In such a scenario, the management server may be the same or different device than the activation server shown in FIG. 1. The activation application may be middleware for the management server. As middleware, the activation application may be configured to perform three way activation for the management server and confirm that each device being managed by the management server is in the activated device card pairs. Backend software (not shown) of the management server (not shown) may perform the management of the devices once the activation and confirmation of the activation application is complete.

Continuing with FIG. 1, the mobile device (MD in FIG. 1) (102) is any type of portable computing device that includes functionality to connect to a network (106). For example, the mobile device may be a smart phone, a standard mobile phone, a tablet computing device, or any other portable device. In one or more embodiments of the invention, the mobile device (102) is used by a user. Specifically, a user may control the mobile device. A user may be any individual or group of individuals that may access and select features on the mobile device. In alternative or additional embodiments of the invention, the mobile device (102) may be used and controlled by another machine. In such embodiments, the mobile device (102) may act without user interaction and communicate only with machines or a backend system. The mobile device (102) includes non-secured memory (120) and a mobile device activation module (122) in one or more embodiments of the invention. In one or more embodiments of the invention, the mobile device may include additional components not shown in FIG. 1.

In one or more embodiments of the invention, non-secured memory (120) corresponds to storage for storing data on the mobile device. In one or more embodiments of the invention, the non-secured memory (120) is memory that may be accessed by virtual any application executing on the mobile device (102). Specifically, the non-secured memory (120) does not include heightened security features for restricting access to the memory, such as those features in the secured memory (126) of the security module card (104) (discussed below). In one or more embodiments of the invention, the non-secured memory (120) stores a public key (124). The public key (124) is a cryptographic key for decrypting communications from the activation server (100). Specifically, the public key (124) is the key for decrypting communications encrypted using corresponding private key (116) (discussed above).

In one or more embodiments of the invention, because the mobile device (102) has non-secured memory (120), performing activation steps using the public key (124) rather than any shared secret key means that security of the system is not compromised if a nefarious user or program accesses the key. In other words, because the public key is only used for decryption and is public, the exposure of the public key does not change the ability to authenticate a particular communication as coming from a particular source. In other words, the encrypted communication cannot be modified and re-encrypted using the public key in one or more embodiments of the invention.

In one or more embodiments of the invention, the non-secured memory is operatively connected to the mobile device activation module (122). Specifically, the mobile device activation module (122) includes functionality to access the non-secured memory (120). The mobile device activation module (122) includes functionality to perform activation steps for the mobile device (102). The mobile device activation module (122) may be implemented in hardware, software, or a combination thereof.

In one or more embodiments of the invention, the mobile device activation module is implemented as part of a client. The client may be configured to use the services of the service provider. For example, the client may be configured to receive management operations from a management server. The activation module may be to the part of the client that includes functionality to perform the activation steps and confirm that three way activation is performed prior to allowing management operations to proceed to the client. The client may be configured to use the services of the service provider.

The security module card (104) corresponds to a secured device having an integrated circuit and used to authenticate and identify a particular user. In one or more embodiments of the invention, the security module card is provided to the user by the carrier. The security module card (104) may be embedded in the mobile device. Further, the security module card may be removable from the mobile device. In one or more embodiments of the invention, the security module card is removable by either removing a cover of the mobile device or pulling out the security module card with or without the removal of screws or other non-permanent fixation mechanism. In one or more embodiments of the invention, the security module card is capable of and intended to be removed by a user from the mobile device without damaging the mobile device in order to allow the user to easily switch to a different mobile device. In one or more embodiments of the invention, the security module card is a subscriber identity module (SIM) card.

Rather than embedding the security module card (104) in the mobile device (102), the security module card may be operatively connected to the mobile device (102) via a wired or wireless external link. In such a scenario, the wireless link may be via blue tooth, near field communications link, or other link requiring a close distance between the mobile device and the security module card (e.g., less than one foot or less than five feet distance).

Continuing with FIG. 1, the security module card includes secured memory (126) and a card activation module (128). Secured memory (126) is a secured physical storage location on the security module card. In one or more embodiments of the invention, the secured memory (126) is only accessible by applications (e.g., the card activation module) executing on the security module card (104). The secured memory (126) includes functionality to store a secret key, a key identifier, and an identifier of the mobile device. The secret key (130) and the key identifier (132) are copies of the secret key (114) and the key identifier (112), respectively, stored in the data repository of the activation server (100). Specifically, the secret key (130) and the key identifier (132) may be used to communicate with the activation server (100). In one or more embodiments of the invention, the secret key (130) and key identifier (132) are stored on the security module card (104) prior to the security module card (104) being provided to the user. For example, a carrier may store the secret key (130) and key identifier (132) on the security module card (104) while the security module card is in the carrier's possession. As another example, the security module card (104) may be manufactured with the secret key (130) and key identifier (132) stored in the secured memory (126) as part of the manufacturing process.

In one or more embodiments of the invention, the identifier of the mobile device (labeled ID of MD in FIG. 1) (134) is a unique identifier for the mobile device (102). For example, the identifier of the mobile device (134) may be an international mobile equipment identity (IMEI) code.

In one or more embodiments of the invention, the secured memory (126) is operatively connected to a card activation module (128). The card activation module (128) includes functionality to perform activation steps on behalf of the security module card (104). The card activation module (128) may be implemented in hardware, software, or a combination thereof. In one or more embodiments of the invention, the card activation module (128) is implemented as part of a client. Specifically, the card may have a client installed, and the card activation module may be the part of the client that includes functionality to perform the activation steps and confirm that three way mutual trust is established before allowing management operations to proceed from the activation server and/or mobile device. The client may be an applet. In one or more embodiments of the invention, the client is implemented using Oracle® Java Card technology.

In one or more embodiments of the invention, a network (106) is interposed between the mobile device (102) and the activation server (100). The network may be, for example, a local area network (LAN), a wide area network (WAN) such as the Internet, cellular network, or any other type of network or combination thereof. The network (106) includes functionality to transmit communications between the mobile device (102) and the activation server (100) in one or more embodiments of the invention.

While FIG. 1 shows a configuration of components, other configurations may be used without departing from the scope of the invention. For example, various components may be combined to create a single component. As another example, the functionality performed by a single component may be performed by two or more components.

FIGS. 2-5 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
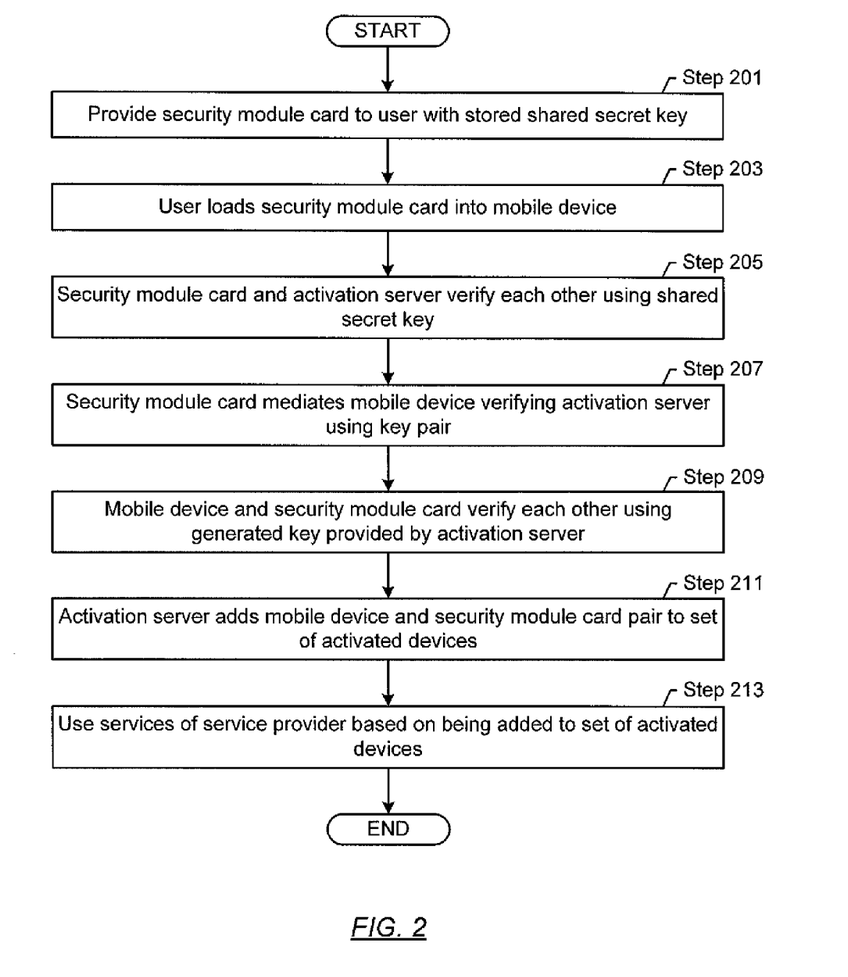
FIGS. 2-5 show flowcharts in one or more embodiments of the invention.

FIG. 2 shows a general diagram for activation in one or more embodiments of the invention. In Step 201, the security module card is provided to the user with the stored shared secret key. For example, the user may contact the carrier (e.g., in person, over the telephone or Internet, or through other such median) and obtain a security module card. As another example, the user may obtain the security module card through a retailer. In one or more embodiments of the invention, when the user obtains the security module card, the secured memory of the security module card includes data, such as the shared secret key. Specifically, a first copy of the shared secret key may be stored on the security module card and a second copy of the shared secret key may be stored by the activation server. In one or more embodiments of the invention, if the secret key corresponds to a batch of security module cards, then the secret key that is for the batch is stored in the security module card.

In Step 203, the user loads the security module card into the mobile device in one or more embodiments of the invention. A user may load the security module card into the mobile device, for example, because the user is adding a new security module card to a new mobile device or an existing mobile device, or because the user is adding an existing security module card to a new mobile device (e.g., one that the user has previously not used with the security module card). A user is deemed to load the security module card into the mobile device when a person loads the security module card into the mobile device on behalf of a user. In one or more embodiments of the invention, the loading of the security module card into the mobile device triggers the activation procedure. For example, the first time that the mobile device with the security module is powered with the security module card, the activation procedure described herein may be used in one or more embodiments of the invention. Alternatively, the activation procedure may be triggered by the user instigating a first communication using the security module card and the mobile device.

In Step 205, the security module card and the activation server verify each other using a shared secret key. Specifically, the security module card verifies the activation server using by confirming that the activation server uses a copy of the same shared secret key as the mobile device. Particular steps that may be used for the security module card and the activation server to verify each other may be performed as described below and in FIGS. 3 and 4.

In one or more embodiments of the invention, by performing Step 205 for verification, when the activation application is middleware, the necessity of loading a large amount of card identifiers into the middleware may be avoided. In other words, large amounts of unused data are not managed in a system in which a small percentage of security module cards become activated.

In Step 207 of FIG. 2, the security module card mediates the mobile device verifying the activation server using the key pair (i.e., the private key and the corresponding public key). In one or more embodiments of the invention, the mobile device verifies the activation server by confirming that the activation server is using the correct private key.

In one or more embodiments of the invention, the activation server verifies the mobile device based on the activation server having verified the security module card. Specifically, once the activation server verifies the security module card and the security module card completes verification of the mobile device, the activation server considers the mobile device to be verified in one or more embodiments of the invention. In other words, the activation server is configured to transitively, through the security module card, verify the mobile device.

In one or more embodiments of the invention, by performing the verification of Step 207, when the activation application is part of a client and the service provider is a carrier, the client does not have to be aware to which carrier the client has to be registered. Rather, the knowledge is present in the security module card and deployed together with the security module card. Particular steps that may be used for the mobile device and the activation server to verify each other may be performed as described below and in FIGS. 3-5.

In Step 209 of FIG. 2, the mobile device and the security module card verify each other using a key generated (i.e., generated key) by the activation server in one or more embodiments of the invention. The verification allows the security module card and the mobile device to be securely authenticated to each other. When the mobile device application module and the card activation module are part of clients, the secure authentication allows the respective clients to be mutually verified without further verification steps. For example, the client on the mobile device is a payment application and the client on the security module card has payment information, the client on the security module card may provide the payment application with the payment information based on the mutual verification (i.e., mutual trust). Particular steps that may be used for the mobile device and the security module card to verify each other may be performed as described below and in FIGS. 3 and 5.

In Step 211 of FIG. 2, the activation server adds the mobile device and the security module card pair to the set of activated devices in one or more embodiments of the invention. Specifically, the activation server stores an identifier of the mobile device with an identifier of the security module card as a pair in the activated device card pairs of the data repository. In one or more embodiments of the invention, the addition of the security module card and the mobile device pair to the set of activated devices triggers a licensing event whereby a service provider may manage applications on the security module card and the mobile device.

In Step 213, based on the being added to the set of activated devices, the mobile device and the security module card uses the services of the service provider in one or more embodiments of the invention. In one or more embodiments of the invention, because of the three way mutual trust, the user is assured that the mobile device and the security module card are connected to the correct service provider. Based on the mutual trust, the service provider may manage the mobile device and the security module card. Specifically, based on the security module card verifying the activation server, the security module card may allow the service provider associated with the activation server to perform the sensitive operations on the security module card and the mobile device.

Although not shown in FIG. 2, the security identification of the mobile device and the security module card pair may be propagated to the other systems (e.g., other service providers, other content delivery systems) for targeting content to the mobile device.

Figure 3:
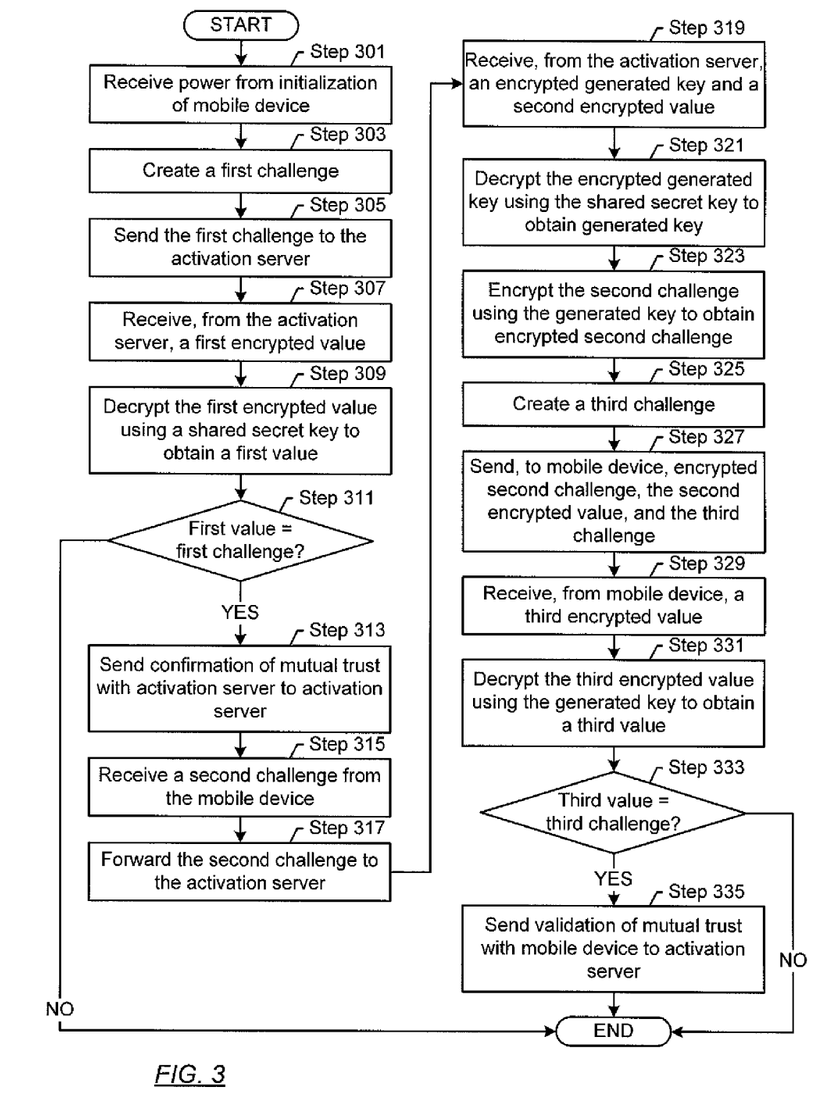

FIG. 3 shows a flowchart for authentication in one or more embodiments of the invention. In one or more embodiments of the invention, the Steps shown in FIG. 3 may be performed by the security module card.

In Step 301, power from initialization of the mobile device is received. For example, as part of powering on the mobile device, the mobile device may provide power to the integrated circuit of the security module card.

In Step 303, a first challenge is created in one or more embodiments of the invention. In one or more embodiments of the invention, the first challenge is created based on the security module card confirming that the security module card and mobile device pair is not yet activated. In one or more embodiments of the invention, creating the first challenge may be performed, for example, by a random number generator or other techniques.

In Step 305, the first challenge is sent to the activation server in one or more embodiments of the invention. In one or more embodiments of the invention, the first challenge may be sent with one or more of the following: a key identifier of the shared secret key, a version number of the card activation module, a counter value, registration data and key diversification data, a signature algorithm identifier, and a signature for the message having the first challenge. In one or more embodiments of the invention, the counter may be a value that is incremented at each communication between the security module card and the activation server. The first challenge may be sent with additional or alternative data without departing from the scope of the claims.

In Step 307, a first encrypted value is received from the activation server. The first encrypted value is decrypted using the shared secret key to obtain a first value in Step 309.

In Step 311, a determination is made whether the first challenge is equal to the first value. In other words, a determination is made whether the first challenge matches the first value. If the first value and the first challenge are not equal or do not match, then the method may proceed to end. Specifically, with a high probability, if a different key is used or if a different challenge is encrypted, the decryption using the shared secret key will not result in the same value. Thus, the security module card may assume that the activation server does not have a correct copy of the shared secret key and, therefore, may not be trusted. Alternatively, although not shown in FIG. 3, the flow may proceed to Step 303 if the values are not equal. For example, the security module card may allow the activation server another attempt to account for the possibility of an error in the data transmission.

If the first challenge is equal to the first value, the flow may proceed to Step 313. In Step 313, confirmation of mutual trust is sent to the activation server in one or more embodiments of the invention. Specifically, the security module card may notify the activation server that the security module card verified the activation server. In one or more embodiments of the invention, the Steps of 303-313 may be performed for the security module card and the activation server to verify each other.

Continuing with FIG. 3, a second challenge is received from the mobile device in Step 315. In Step 317, the second challenge is forwarded to the activation server. In one or more embodiments of the invention, Steps 315 and 317 may be performed as part of the security module card mediating the verification between the mobile device and the activation server in one or more embodiments of the invention.

An encrypted generated key and a second encrypted value are received from the activation server in Step 319 in one or more embodiments of the invention. The encrypted generated key and the second encrypted value may be received in a single message or multiple messages from the activation server. In one or more embodiments of the invention, the encrypted generated key is encrypted using the shared secret key. In Step 321 the encrypted generated key is decrypted using the shared key to obtain a generated key in one or more embodiments of the invention. In Step 323, the generated key is used to encrypt the second challenge received in Step 315. Specifically, the second challenge and the generated key are used as inputs to an encryption algorithm. For example, in addition to forwarding a copy of the second challenge to the activation server, the security module card may store a copy of the second challenge. Thus, the mobile device may use the second challenge to verify both the activation server and the security module card as discussed below.

Continuing with FIG. 3, in Step 325, a third challenge is created in one or more embodiments of the invention. Specifically, the security module card may create the third challenge in a manner similar to creating the first challenge in Step 303. The third challenge may be used by the security module card to verify the mobile device in one or more embodiments of the invention.

In Step 327, the encrypted second challenge, the second encrypted value, and the third challenge are sent to the mobile device. The security module card may send the encrypted second challenge, the second encrypted value, and the third challenge in a single message or in multiple messages. Steps 327 and Step 319 that are directed to receiving and forwarding the second encrypted value may be performed as part of mediating the verification between the mobile device and the activation server.

In Step 329, a third encrypted value is received from the mobile device. The third encrypted value is decrypted using the generated key to obtain a third value in one or more embodiments of the invention in Step 331. Decrypting the third encrypted value may be performed using the third encrypted value and the generated key as an input to a symmetric key encryption algorithm.

In Step 333, a determination is made whether the third value is equal to or matches the third challenge. Specifically, the security module card may confirm that the mobile device used the same challenge that the security module card sent to the mobile device and the same generated key. In one or more embodiments of the invention, mobile device obtains the generated key from the second encrypted value that is received from the activation server. In other words, the security module card does not send the generated key to the mobile device, but only forwards an encrypted value from the activation server to the security module card that includes the generated key. Thus, the verification of the mobile device to the security module card is based on confirming that the security module card is capable of decrypting the generated key from the activation server.

If the third value does not match the third challenge, then the method may proceed to end without mutual trust being established. If the third challenge does match the third encrypted value, the flow may proceed to Step 335 where a validation of mutual trust with the mobile device is sent to the activation server. Further, if the security module card verifies the mobile device based on the third challenge, the activation server may accept the verification based on the prior verification of the security module card.

In one or more embodiments of the invention, Steps 319-333 regarding the use of the generated key and the third challenge may be performed as part of verification of the mobile device and the security module card.

Figure 4:
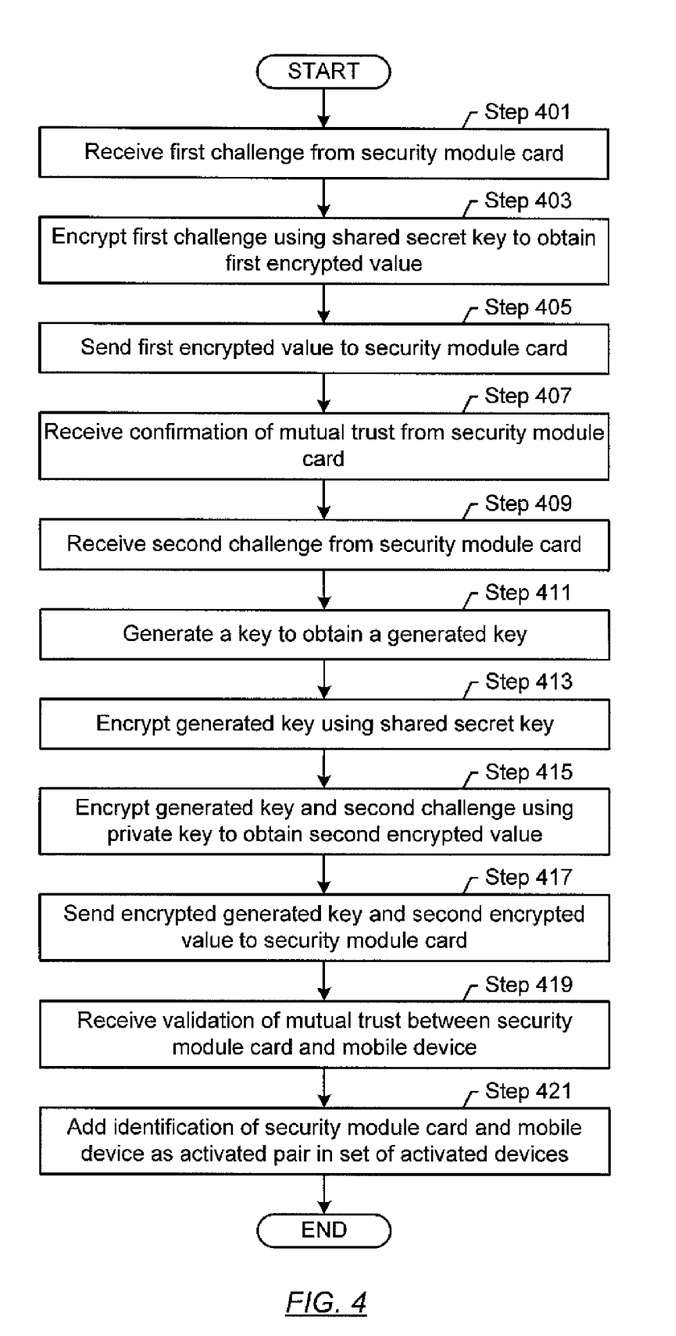

FIG. 4 shows a flowchart for activation in one or more embodiments of the invention. In one or more embodiments of the invention, the steps shown in FIG. 4 may be performed, for example, by the activation server.

In Step 401, a first challenge is received from the security module card in one or more embodiments of the invention. As discussed above, the first challenge may be sent, and subsequently received with one or more of the following: a key identifier of the shared secret key, a version number of the card activation module, a counter value, registration data and key diversification data, a signature algorithm identifier, and a signature for the message having the first challenge. The activation server may verify the signature using the signature algorithm identifier and verify that the counter value matches an expected counter value. Additionally or alternatively, the activation server may use the key identifier to obtain the correct shared secret key, from the data repository, for the security module card in one or more embodiments of the invention.

The first challenge is encrypted using the shared secret key to obtain a first encrypted value in Step 403. The first encrypted value is sent to the security module card in Step 405 in one or more embodiments of the invention. In Step 407, confirmation of mutual trust may be received from the security module card. Steps 401-407 may be performed as part of the security module card and the activation server verifying each other in one or more embodiments of the invention.

Although not shown in FIG. 3 or 4, such verification between the security module card and the activation server may include additional steps for the activation server to verify the security module card. By way of an example, such steps may include the activation server creating and sending a fourth challenge that is received by the security module card. The security module card may encrypt the fourth challenge using the shared secret key to create another encrypted value and may send the encrypted value to the activation server. The activation server may decrypt the encrypted value and verify that the fourth challenge that is decrypted matches the fourth challenge received by the security module card to authenticate the security module card. If the values match, then the activation server verifies the security module card. If the values do not match, then the activation server does not verify the security module card. As another example, the steps may be performed by the activation server when creating a GlobalPlatform Secure Channel to communicate with the security module card as part of starting communication with the security module card.

Continuing with FIG. 4, the second challenge is received from the security module card in Step 409.

The activation server generates a key to obtain a generated key in Step 411. Generating a key may be performed in a manner similar to creating a challenge. In Step 413, the activation server encrypts the generated key using the shared secret key to obtain the encrypted generated key. As discussed above with respect to FIG. 3, the encrypted generated key is used by the security module card to verify the mobile device.

Continuing with FIG. 4, the activation server encrypts the generated key and the second challenge using a private key to obtain a second encrypted value in one or more embodiments of the invention in Step 415. The generated key and the second challenge may be encrypted together or separately.

For example, in one or more embodiments of the invention, the second challenge may be concatenated with the generated key to obtain a concatenated value. The concatenated value may be encrypted by a symmetric key encryption algorithm using the private key as an input. As discussed above, the second encrypted value is sent to the mobile device via the security module card in Step 417. The second challenge in the second encrypted value is used by the mobile device to verify the activation server in one or more embodiments of the invention. The generated key in the second encrypted value is used by the mobile device to verify the security module card in one or more embodiments of the invention.

In Step 419, the validation of mutual trust is received between the security module card and the mobile device from the security module card. Based on the previous validation of mutual trust from the security module card with the activation server, the activation server is in mutual trust with the mobile device.

In Step 421, the activation server adds identification of the security module card and the mobile device pair as an activated pair in the set of activated devices in one or more embodiments of the invention. Specifically, the activation server stores an identifier of the security module card and an identifier of the mobile device in the data repository.

Figure 5:
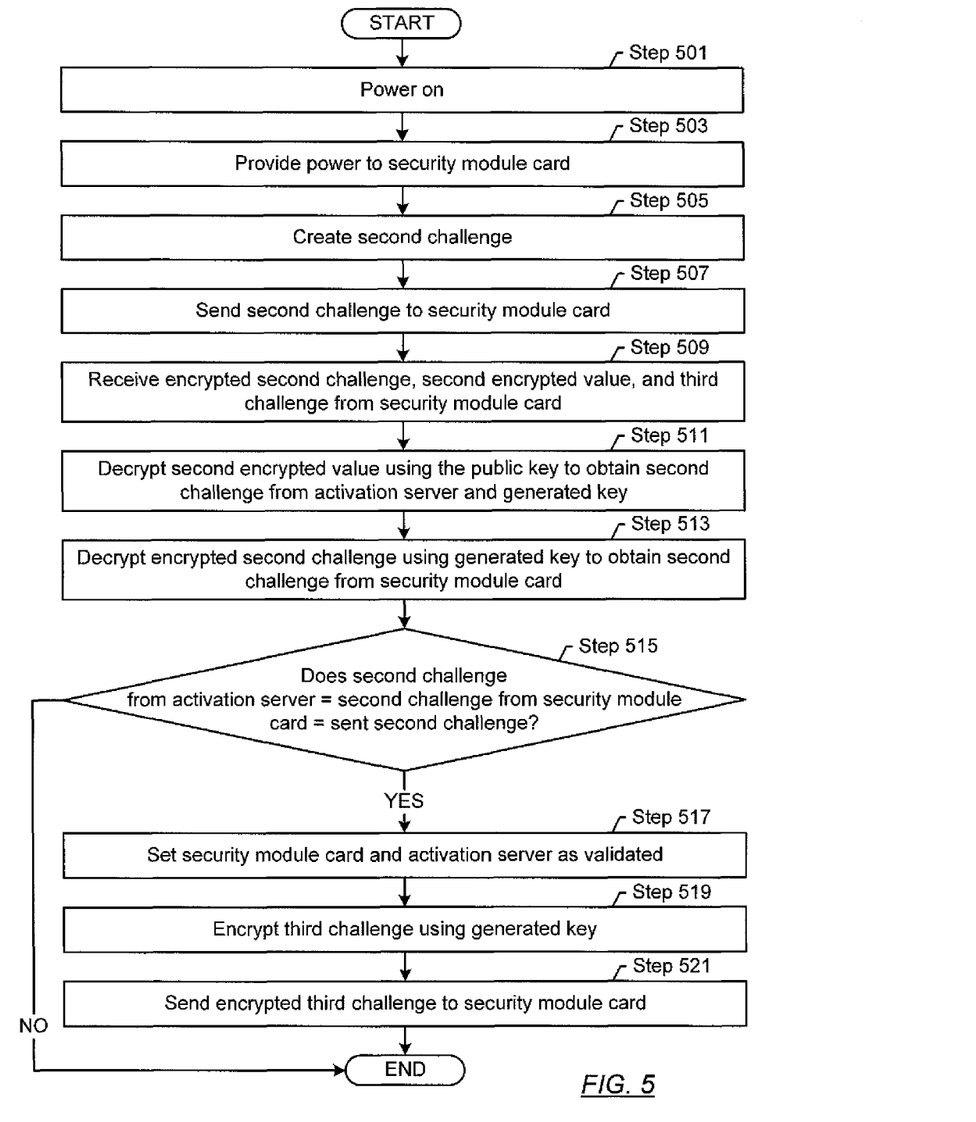

FIG. 5 shows a flowchart for activation in one or more embodiments of the invention. Specifically, the Steps shown in FIG. 5 may be performed, for example, by the mobile device.

In Step 501, the mobile device is powered on. Powering on the mobile device boots the mobile device and subsequently powers the security module card in Step 503 in one or more embodiments of the invention. In Step 505, the second challenge is created. The mobile device may create the second challenge in a manner similar to the security module card creating the first challenge in one or more embodiments of the invention. The second challenge is sent to the security module card in Step 507.

In Step 509, the encrypted second challenge, the second encrypted value, and the third challenge are received from the security module card. The second encrypted value is decrypted using the public key to obtain the second challenge from the activation server and the generated key in Step 511 in one or more embodiments of the invention. Step 511 may also include partitioning the second challenge and the generated key in embodiments in which the activation server concatenates the second challenge and the generated key together prior to creating the second encrypted value.

In Step 513, the encrypted second challenge is decrypted using the generated key to obtain the second challenge from the security module card. In one or more embodiments of the invention, the mobile device uses the generated key from the activation server in the second encrypted value to decrypt the encrypted second challenge.

In Step 515, a determination is made whether the second challenge from the activation server is equal to the second challenge from the security module card and equal to the sent second challenge. In other words, a determination is made whether all three second challenges are the same. Although FIG. 5 shows a single determination step, Step 515 may correspond to multiple determinations. If either received second challenge is not equal to the sent second challenge, then the mobile device may determine that either or both the activation server and the security module card are not verified depending on which second challenge does not match the sent second challenge. In such a scenario, the flow may proceed to end.

If the second challenges are equal, then the security module card and the activation server are set as validated in Step 517. Specifically, based on the matches, the mobile device confirms the validity of the security module card and the activation server.

In Step 519, the third challenge is encrypted using the generated key to obtain the encrypted third challenge in one or more embodiments of the invention. The encrypted third challenge is sent to the security module card in Step 521 in one or more embodiments of the invention. Thus, the security module card may verify the mobile device using the encrypted third challenge.

Figure 6:
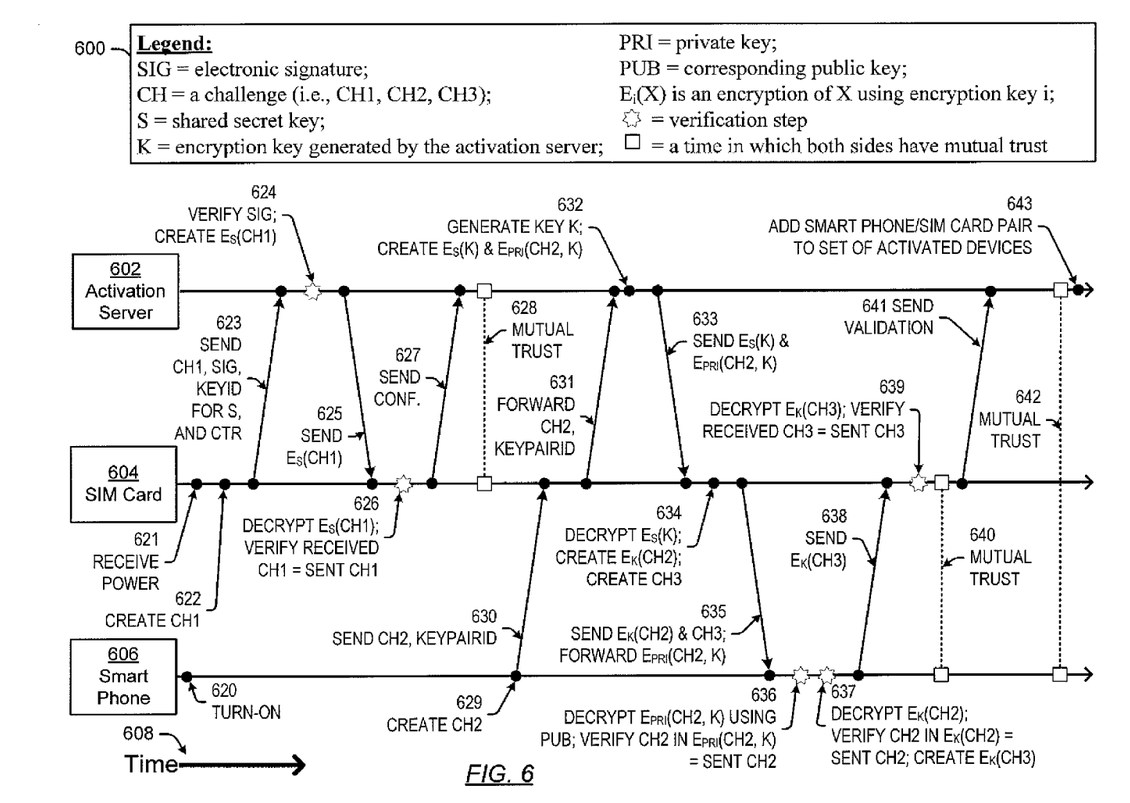
FIG. 6 shows an example timing diagram in one or more embodiments of the invention.

FIG. 6 shows an example timing diagram in one or more embodiments of the invention. The following example is for explanatory purposes only and not intended to limit the scope of the invention. Specifically, the example shown in FIG. 6 and discussed below is only an example of the possible steps that may be performed and the possible ordering of the example steps in accordance with in one or more embodiments of the invention. Some or all of the steps may be omitted, performed in different order, or modified without departing from the scope of the invention.

In the following example, consider the scenario in which the mobile device is a smart phone (606) and the security module card is a SIM card (604). FIG. 6 includes various acronyms for the purpose of legibility and brevity. A legend (600) is included on FIG. 6 to explain each of the various acronyms most commonly used. Other acronyms will be explained below. Further, FIG. 6 includes a time arrow (608) to show the direction of time in relation to the timing diagram.

For the following example, consider the scenario in which a user goes to a carrier and obtain the SIM card (604) after signing a contract. Because the user does not want any of the smart phones that the carrier offers, the user obtains the smart phone (606) from a separate retailer. The user inserts the SIM card (604) into the smart phone (606) and turns on (620) the smart phone to provide power to the smart phone. As part of the boot process, the SIM card (604) receives power (621) from the smart phone (606). Because the SIM card (604) is not yet activated, the SIM card starts an activation procedure with the activation server (602), which is controlled by the carrier. Although not shown in the example FIG. 6, the SIM card (604) and activation server (602) may start the activation process by first establishing a GlobalPlatform Secure Channel to create a secure communication session. During the establishing phase, the activation server (602) may authenticate the SIM card (604).

Continuing with the example, the SIM card creates challenge CH1 (622) and sends challenge CH1 with a key identifier (KeyID) for shared secret key S, a counter value (CTR), and a signature (SIG) (623) to the activation server (602). After confirming that the counter value is the expected counter value, the activation server (602) verifies that the signature over the sent data matches the expected signature and creates an encryption (i.e., encrypts) of challenge CH1 using the shared secret key S (624). The activation server (602) sends the encryption of challenge CH1 (625) to the SIM card (604).

After receiving the encryption of challenge CH1, the SIM card (604) decrypts the challenge using the shared secret key S and verifies that the sent challenge CH1 matches the challenge CH1 that the SIM card (604) decrypted (626). Accordingly, the SIM card (604) sends a confirmation (Conf.) of the mutual trust (627) to the activation server (602). Based on the match and the prior verification of the SIM card (604) by the activation server (602), the activation server (602) and the SIM card (604) are in mutual trust (628).

Further, the smart phone (606) creates challenge CH2 (629). The smart phone (606) sends the challenge CH2 (630) and a key pair identifier (KeyPairID) (630) for the public and private keys to the SIM card (604). The SIM card (604) stores a copy of challenge CH2. Further, the SIM card (604) forwards challenge CH2 and the key pair identifier (631) to the activation server (602). The activation server (602) generates key k, concatenates challenge CH2 and key k into a single value, creates a first encryption of the single value using the private key corresponding to the key pair identifier, and creates a second encryption of the key k using the shared secret key S (632). The activation server (602) sends the first encryption and the second encryption (633) to the SIM card (604).

The SIM card (604) decrypts key k encrypted using the shared secret key, creates an encryption of challenge CH2 using the decrypted key k, and creates challenge CH3 (634). The SIM card sends the encrypted challenge CH2, sends challenge CH3, and forwards the encryption of the challenge CH2 concatenated with the key k (635) to the smart phone (606). In one or more embodiments of the invention, the forwarding of the challenge and the key pair identifier (631) and the forwarding of the encrypted concatenation (635) corresponds to the SIM card (604) mediating the verification of the activation server (636) by the smart phone.

The smart phone (606) decrypts the encryption of the challenge CH2 concatenated with the key k using the corresponding public key to obtain a decrypted concatenation. The smart phone (606) further parses the decrypted concatenation to obtain challenge CH2 from the decrypted concatenation, and verifies that the obtained challenge CH2 is equal to the sent challenge (636). At this stage, based on the verification that the two are equal, the smart phone (606) trusts the activation server (602). The activation server (602) may not yet trust the smart phone (606).

Continuing with FIG. 6, the smart phone (606) also decrypts challenge CH2 that is encrypted using the generated key k and verifies that the decrypted challenge CH2 is equal to the sent challenge CH2 (637). The verification verifies that both the smart phone and the security module card are using the same generated key k from the activation server. In other words, the smart phone verifies the security module card based on determining that the security module card is able to decrypt the generated key from the activation server. Based on the verification, the smart phone (606) trusts the SIM card (604). Accordingly, the smart phone creates an encryption of challenge CH3 (637) using the generated key k and sends the encryption of challenge CH3 (638) to the SIM card (604). The SIM card (604) decrypts the encryption of challenge CH3 and verifies that the received challenge CH3 in the encryption is equal to the sent challenge CH3 (639). Based on the two verifications (i.e., 637, 639), the SIM card (604) and the smart phone (606) are in mutual trust (640).

Based on the mutual trust (640), the smart phone sends a validation of mutual trust (641) to the activation server (602). Because the activation server (602) has verified the SIM card (604) and the because of the mutual trust (640), the activation server (602) trusts the smart phone (606). Thus, the activation server (602) and the smart phone (606) are in mutual trust (642). Accordingly, the activation server adds the smart phone/SIM card pair to the set of activated devices (643). In one or more embodiments of the invention, at this stage, the carrier associated with the activation server (602) may manage the smart phone (606) and SIM card (604). Specifically, both the smart phone (606) and SIM card (604) trust the activation server (602) and, accordingly, management software of the carrier to allow the carrier to perform privileged actions in one or more embodiments of the invention.

As discussed above, the steps shown in FIG. 6 are only an example and not intended to limit the scope of the claims. Other actions may be performed without departing from the scope of the claims.

Figure 7:
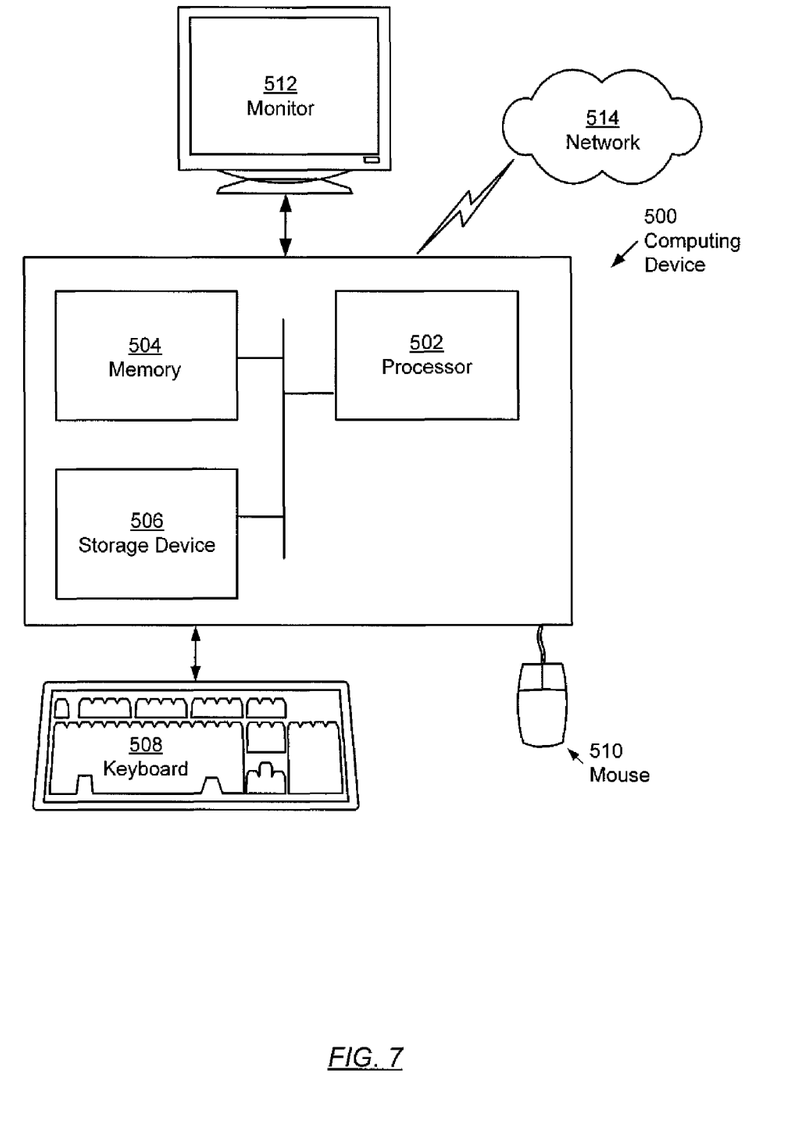
FIG. 7 shows a computer device in accordance with one or more embodiments of the invention.

Embodiments of the invention may be implemented on virtually any type of computing device regardless of the platform being used. For example, the activation server or mobile device may correspond to a computing device, with one or more of the components described below and in FIG. 7. For example, as shown in FIG. 7, a computing device (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computing device (500) may also include input means, such as a keyboard (508), a mouse (510), or a microphone (not shown). Further, the computing device (500) may include output means, such as a monitor (512) (e.g., a liquid crystal display (LCD), a plasma display, or cathode ray tube (CRT) monitor). The computing device (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computing device (500) includes at least the minimal processing, input, and/or output means necessary to practice embodiments of the invention.

Further, those skilled in the art will appreciate that one or more elements of the aforementioned computing device (500) may be located at a remote location and connected to the other elements over a network. Further, embodiments of the invention may be implemented on a distributed system having a plurality of nodes, where each portion of the invention (e.g., data repository, activation application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored, temporarily or permanently, in whole or in part, on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for activation comprising:
 (a) verifying, by a security module card, an activation server using a shared secret key and a first challenge;
 (b) mediating, by the security module card, in response to verifying the activation server, a verification of the activation server by a mobile device, wherein the verification uses a second challenge and a key pair;
 (c) encrypting, by the security module card, the second challenge using a generated key to obtain an encrypted second challenge, wherein the generated key is generated by the activation server;

(d) transmitting, by the security module card, the encrypted second challenge and a third challenge to the mobile device, wherein the mobile device verifies the security module card using the encrypted second challenge;

(e) receiving, by the security module card, an encrypted third challenge from the mobile device;

(f) decrypting, by the security module card, the encrypted third challenge to obtain a received third challenge;

(g) verifying, by the security module card, the mobile device based on the received third challenge being equal to the third challenge sent to the mobile device; and (h) sending, by the security module card, a validation of mutual trust between the security module card and the mobile device to the activation server, wherein (a) is performed before (c) and wherein (c) is performed before (h).

2. The method of claim 1, wherein verifying the activation server comprises:

sending the first challenge to the activation server;

receiving, from the activation server, a first encrypted value in response to sending the first challenge;

decrypting the first encrypted value using the shared secret key to obtain a first value; and authenticating the activation server based on the first value being equal to the first challenge.

3. The method of claim 2, further comprising:

receiving, by the security module card from the activation server, a fourth challenge;

encrypting, by the security module card, the fourth challenge using the shared secret key to create a second encrypted value; and sending the second encrypted value to the activation server, wherein the activation server decrypts the second encrypted value and verifies that the fourth challenge in the decrypted second encrypted value is equal to the fourth challenge received by the security module card to authenticate the security module card.

4. The method of claim 2, further comprising:

sending a secret key identifier of the secret key, wherein the activation server communicates with a plurality of security module cards using a corresponding unique secret key, wherein the security module card is one of the plurality of security module cards.

5. The method of claim 1, wherein (b) and (c) are performed concurrently.

6. The method of claim 1, wherein the secret key is stored on the security module card prior to the security module card being provided to a user of the mobile device.

7. The method of claim 1, wherein the activation server authenticates the security module card when creating a GlobalPlatform Secure Channel to communicate with the security module card prior to (a).

8. The method of claim 1, wherein mediating the verification of the activation server by the mobile device comprises:

forwarding the second challenge received from the mobile device to the activation server;

receiving, from the activation server, a first encrypted value;

sending, to the mobile device, the first encrypted value, wherein the mobile device decrypts the first encrypted value using a public key to obtain a first value, wherein the public key is in the key pair, and wherein the mobile device verifies the activation server by confirming that the second challenge sent by the mobile device is equal to the second challenge in the first value.

9. The method of claim 8, further comprising:

decrypting, by the security module card, an encrypted generated key using the shared secret key to obtain the generated key; and wherein the mobile device extracts the generated key from the first value and decrypts the encrypted second challenge using the generated key to obtain a decrypted second challenge, and wherein the mobile device validates the security module card based on the second challenge sent by the mobile device being equal to the decrypted second challenge.

10. The method of claim 1, wherein the activation server validates the mobile device based on the validation of the security module card and the receiving of the validation of mutual trust from the security module card.

11. A security module card for activation, the security module card comprising:

secured memory comprising a shared secret key; and a card activation module configured to:

(a) verify an activation server using the shared secret key and a first challenge;

(b) mediate, in response to verifying the activation server, a verification of the activation server by a mobile device, wherein the verification uses a second challenge and a key pair;

(c) encrypt the second challenge using a generated key to obtain an encrypted second challenge, wherein the generated key is generated by the activation server;

(d) transmit the encrypted second challenge and a third challenge to the mobile device, wherein the mobile device verifies the security module card using the encrypted second challenge;

(e) receive an encrypted third challenge from the mobile device;

(f) decrypt the encrypted third challenge to obtain a received third challenge;

(g) verify the mobile device based on the received third challenge being equal to the third challenge sent to the mobile device; and (h) send a validation of mutual trust between the security module card and the mobile device to the activation server, wherein (a) is performed before (c) and wherein (c) is performed before (h).

12. The security module card of claim 11, wherein verifying the activation server comprises:

sending the first challenge to the activation server;

receiving, from the activation server, a first encrypted value in response to sending the first challenge;

decrypting the first encrypted value using the shared secret key to obtain a first value; and authenticating the activation server based on the first value being equal to the first challenge.

13. The security module card of claim 12, wherein the card activation module is further configured to:

receive, from the activation server, a fourth challenge;

encrypt the fourth challenge using the shared secret key to create a second encrypted value;

send the second encrypted value to the activation server, wherein the activation server decrypts the second encrypted value and verifies that the fourth challenge in the decrypted second encrypted value is equal to the fourth challenge received by the security module card to authenticate the security module card.

14. The security module card of claim 12, wherein the card activation module is further configured to:
send a secret key identifier of the secret key, wherein the activation server communicates with a plurality of security module cards using a corresponding unique secret key, wherein the security module card is one of the plurality of security module cards.

15. The security module card of claim 12, wherein (b) and (c) are performed concurrently.

16. The security module card of claim 12, wherein the shared secret key is stored on the security module card prior to the security module card being provided to a user of the mobile device.

17. A system comprising:
a security module card comprising:
  secured memory comprising a shared secret key; and
  a card activation module configured to:
    (a) verify an activation server using the shared secret key and a first challenge;
    (b) mediate, in response to verifying the activation server, a verification of the activation server by a mobile device, wherein the verification uses a second challenge and a key pair;
    (c) encrypt the second challenge using a generated key to obtain an encrypted second challenge, wherein the generated key is generated by the activation server;
    (d) transmit the encrypted second challenge and a third challenge to the mobile device, wherein the mobile device verifies the security module card using the encrypted second challenge;
    (e) receive an encrypted third challenge from the mobile device;
    (f) decrypt the encrypted third challenge to obtain a received third challenge;
    (g) verify the mobile device based on the received third challenge being equal to the third challenge sent to the mobile device; and
    (h) send a validation of mutual trust between the security module card and the mobile device to the activation server,
  wherein (a) is performed before (c) and wherein (c) is performed before (h); and
a mobile device operatively connected to the security module card, and comprising:
  mobile device memory comprising a public key in the key pair; and
  a mobile device activation module configured to:
    send the second challenge to the activation server via the security module card;
    receive from the activation server an encrypted value via the security module card;
    decrypt the encrypted value using the public key to obtain a value, and
    verify the second challenge sent by the mobile device is equal to the second challenge in the value to verify the activation server.

18. The system of claim 17, wherein the security module card is embedded in the mobile device.

19. The system of claim 18, wherein the security module card is a secured identification module (SIM) card.

20. The system of claim 17, wherein the mobile device activation module is further configured to:
receive the third challenge from the security module card;
creates the encrypted third challenge; and
send the encrypted third challenge to the security module card.

* * * * *

UNITED STATES PATENT AND TRADEMARK OFFICE
CERTIFICATE OF CORRECTION

| | | |
|---|---|---|
| PATENT NO. | : 8,607,050 B2 | |
| APPLICATION NO. | : 13/459331 | |
| DATED | : December 10, 2013 | |
| INVENTOR(S) | : Hans et al. | |

It is certified that error appears in the above-identified patent and that said Letters Patent is hereby corrected as shown below:

In the Specification

In column 15, line 3, delete "(KeyPairlD)" and insert -- (KeyPairID) --, therefor.

Signed and Sealed this
Fifteenth Day of July, 2014

Michelle K. Lee
*Deputy Director of the United States Patent and Trademark Office*